(12) United States Patent
Sheffield et al.

(10) Patent No.: US 9,046,625 B2
(45) Date of Patent: Jun. 2, 2015

(54) SYSTEM AND METHOD FOR ANALYZING SEISMIC DATA BACKGROUND

(75) Inventors: Tatum Michael Sheffield, Missouri City, TX (US); Barton A. Payne, Woodlands, TX (US); Kevin L. Deal, Houston, TX (US)

(73) Assignee: CHEVRON U.S.A. INC., San Ramon, CA (US)

( * ) Notice: Subject to any disclaimer, the term of this patent is extended or adjusted under 35 U.S.C. 154(b) by 706 days.

(21) Appl. No.: 13/250,539

(22) Filed: Sep. 30, 2011

(65) Prior Publication Data

US 2013/0083626 A1  Apr. 4, 2013

(51) Int. Cl.
*G01V 1/30* (2006.01)

(52) U.S. Cl.
CPC . *G01V 1/307* (2013.01); *G01V 1/30* (2013.01); *G01V 2210/60* (2013.01); *G01V 2210/641* (2013.01)

(58) Field of Classification Search
USPC .............................. 367/38, 47, 49, 73; 702/14
See application file for complete search history.

(56) References Cited

U.S. PATENT DOCUMENTS

| 5,226,019 | A | * | 7/1993 | Bahorich | 367/74 |
| 5,311,484 | A | * | 5/1994 | Anderson et al. | 367/38 |
| 6,028,820 | A | | 2/2000 | Pisetski et al. | |
| 6,662,111 | B2 | | 12/2003 | West et al. | |
| 7,002,576 | B2 | * | 2/2006 | Sheffield et al. | 345/424 |
| 7,617,053 | B2 | | 11/2009 | Pinnegar et al. | |
| 8,360,144 | B2 | * | 1/2013 | Imhof | 166/250.01 |
| 2006/0104158 | A1 | | 5/2006 | Walls et al. | |
| 2010/0177595 | A1 | * | 7/2010 | Khare et al. | 367/73 |
| 2011/0002194 | A1 | * | 1/2011 | Imhof et al. | 367/53 |
| 2011/0048731 | A1 | * | 3/2011 | Imhof et al. | 166/369 |
| 2012/0261135 | A1 | * | 10/2012 | Nowak et al. | 166/369 |

OTHER PUBLICATIONS

Radovich, B. J., R.B. Oliveros, 1998, 3-D sequence interpretation of seismic instantaneous attributes from the Gorgon Field : The Leading Edge, September, p. 1286-1293.

Yilmaz, O., 2001, "Seismic Data Analysis," 2d ed, Society of Exploration Geophysics, vol. 2, p. 1896.

Barnes, A. E., 1993, "Instantaneous spectral bandwidth and dominant frequency with applications to seismic reflection data," Geophysics, vol. 58, No. 3, pp. 419-428.

* cited by examiner

*Primary Examiner* — Ian J Lobo
(74) *Attorney, Agent, or Firm* — Albert K. Shung

(57) ABSTRACT

A system, method and device may be used to evaluate stacked seismic trace data. A portion of each of a number of seismic traces is isolated and an un-tuned biased volume and a tuned biased volume are produced for each trace. The un-tuned biased volume and tuned biased volume are combined to determine zones having a high probability of containing hydrocarbon resources.

12 Claims, 8 Drawing Sheets

SYSTEM AND METHOD FOR ANALYZING SEISMIC DATA BACKGROUND

BACKGROUND

1. Field

The present invention relates generally to analysis of seismic data, and more particularly to identification of hydrocarbon-bearing regions within a subsurface volume.

2. Background

In analysis of seismic data, high amplitude data can indicate thick hydrocarbon-bearing sands. On the other hand, high amplitude data may instead indicate thick water sands, or hydrocarbon sand layers that are thin, but happen to be tuned with respect to the incident seismic waves. The applicants have determined that combining data biased towards tuned and untuned interpretations allows for distinguishing data that is otherwise ambiguous.

SUMMARY

An aspect of an embodiment of the present invention includes a method for evaluating stacked seismic trace data, including isolating a portion of each of a plurality of seismic traces representing physical properties of a subsurface region by analyzing instantaneous frequency data for the seismic traces, calculating simple sweet un-tuned values for the seismic traces based on instantaneous frequency and instantaneous amplitude, blending the calculated simple sweet un-tuned values with instantaneous phase information for the seismic traces, calculating simple tuned values for the seismic traces based on instantaneous amplitude and instantaneous frequency, blending the calculated simple sweet values with instantaneous phase information for the seismic traces, and cross-plotting the blended simple sweet un-tuned and instantaneous phase information with the blended simple tuned and instantaneous phase information to identify high probability zones that are likely to comprise hydrocarbon resources. The isolating may include selecting a top and base target zone for each seismic trace, such that the isolated portion lies between the selected top and base target zones.

The method may include that the determined zones further include structures identifiable as geo-bodies and further comprising identifying selected geo-bodies in the determined zone as high probability geo-bodies.

The method may include that the seismic traces are full-stack seismic traces.

The method may include selecting areas of the seismic traces based on instantaneous frequencies of the seismic trace.

The method may include that range of the instantaneous frequencies do not show significant changes.

The method may include evaluating stacked seismic trace data by isolating a portion of each of a plurality of seismic traces representing physical properties of a subsurface region by analyzing instantaneous frequency data for the seismic traces, calculating simple sweet un-tuned values for the seismic traces based on instantaneous frequency and instantaneous amplitude, blending the calculated simple sweet un-tuned values with instantaneous phase information for the seismic traces, calculating simple tuned values for the seismic traces based on instantaneous amplitude and instantaneous frequency, blending the calculated simple sweet values with instantaneous phase information for the seismic traces, and cross-plotting the blended simple sweet un-tuned and instantaneous phase information with the blended simple tuned and instantaneous phase information to identify high probability zones that are likely to comprise hydrocarbon resources.

The method may include that the cross-plotted blended information has a connectivity algorithm run on the resulting points and isolate them into separate geobodies.

An aspect of an embodiment of the present invention includes a system for performing any of the foregoing methods.

Aspects of embodiments of the present invention include computer readable media encoded with computer executable instructions for performing any of the foregoing methods and/or for controlling any of the foregoing systems.

DESCRIPTION OF THE DRAWINGS

Other features described herein will be more readily apparent to those skilled in the art when reading the following detailed description in connection with the accompanying drawings, wherein:

FIG. 4a is a chart of calculated values for a simple sweet (SS) attribute and FIG. 4b is a simple sweet (SS) histogram based on the values of FIG. 4a;

FIG. 7a is a chart of calculated values for a simple duo (SD) attribute and FIG. 7b is a simple duo (SD) histogram based on the values of FIG. 7a;

DETAILED DESCRIPTION

Seismic data including information regarding physical properties of a subsurface region of interest may be collected by a number of known methods. In a particular approach, seismic data traces are summed to create stacked traces. The stacked traces can be further processed by migration or other processing methods to reconstruct images of the subsurface structures, which images are then further interpreted to determine the likelihood of the presence of exploitable resources.

Figure 1:
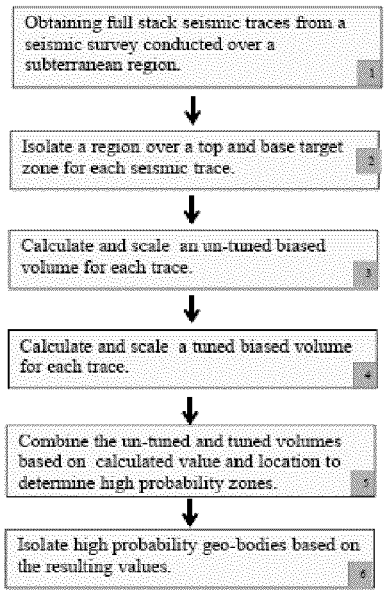
FIG. 1 is a flowchart illustrating a work flow in accordance with an embodiment of the invention.

FIG. 1 is a flow chart illustrating a work flow in accordance with an embodiment of the invention. Full stack seismic traces are obtained 10 for a particular subterranean region. The traces may be obtained by direct measurement activity, or they may be obtained from a service provider, data storage, or other intermediate source.

A user or automated process then isolates a region 12 defining a target zone (i.e., a volume to be analyzed) for the seismic traces. A region can be isolated for example, by defining top and bottom surfaces and/or time intervals for each trace.

For each trace, an un-tuned biased volume is calculated and scaled 14. Likewise, for each trace, a tuned biased volume is calculated and scaled for each trace 16. The tuned and un-tuned biased volumes are then combined based on calculated values and locations to determine zones that have a high probability of being productive zones 18. Based on the values of the combined volumes, high probability geo-bodies are identified 20. Once such geo-bodies are identified, decisions may be made as to locations to conduct exploratory and/or production drilling operations.

Figure 2:
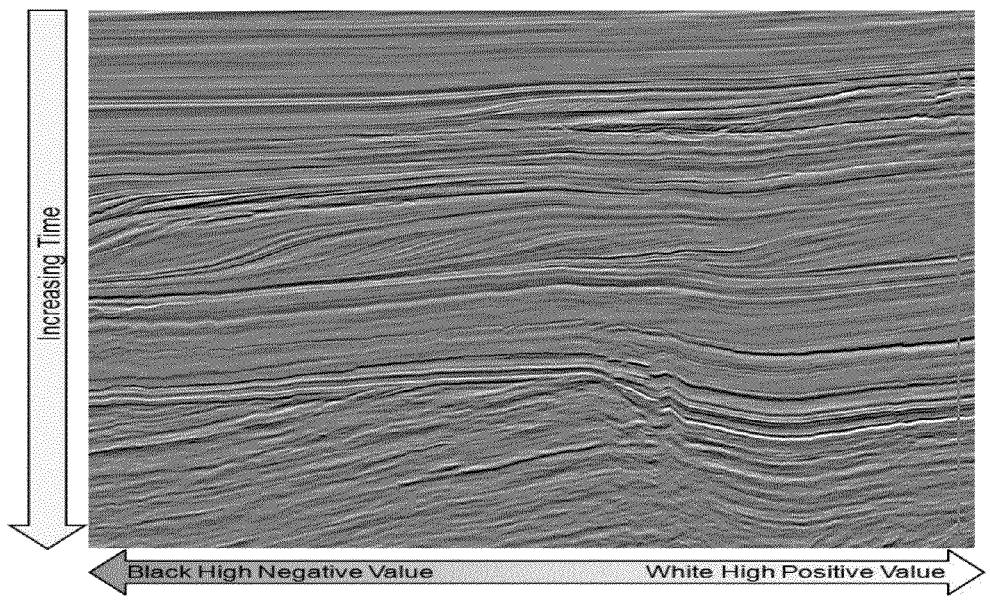
FIG. 2 is an example of a full stack seismic amplitude volume to be analyzed in accordance with an embodiment of the invention.

FIG. 2 illustrates a full stack seismic amplitude volume that may be used as source data in a method in accordance with the present invention. The variation in shade in the figure indicates changes in measured amplitude over the volume. High amplitude correlates generally with subterranean features that produce strong reflections. As will be described further below, high amplitude alone may not always be interpreted as indicating a particular type of geologic structure, but may rather result from particular wave interactions with the subsurface structures. For example, where the wavelength of the interrogating acoustic waves are close to (or an integral fraction of) the thickness of a layer, reflections may be amplified due to positive interference effects.

Figure 3:
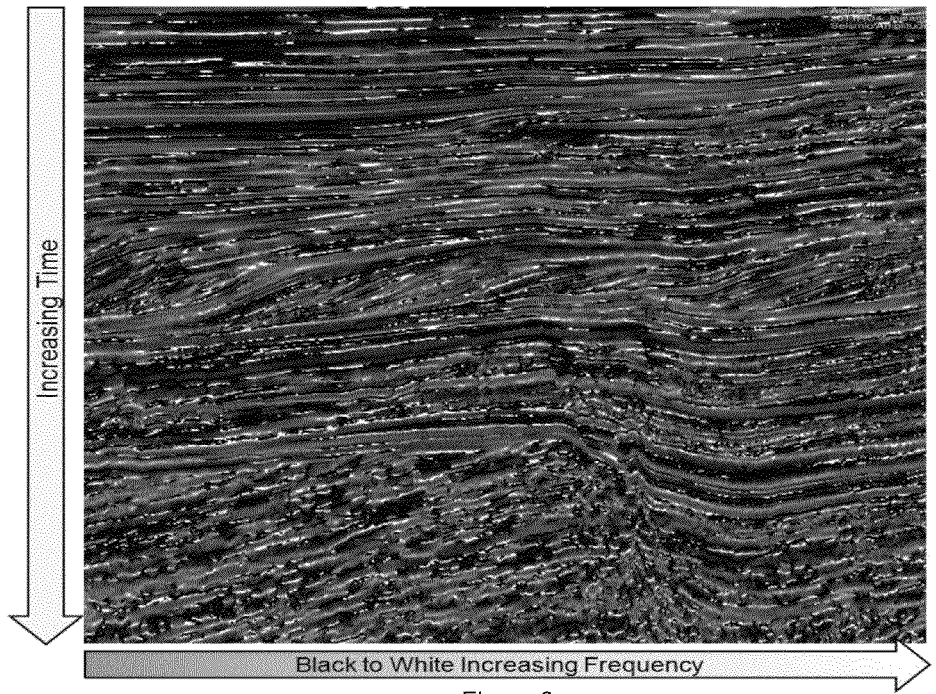
FIG. 3 is an instantaneous frequency (IF) volume based on the amplitude volume of FIG. 2.

FIG. 3 illustrates an instantaneous frequency volume produced based on the stack volume of FIG. 2. In this illustration, black represents low frequencies while white represents high frequencies. Based on the instantaneous frequency volume a region may be isolated over a top and base target zone for each trace. The isolation may be user-driven, or may be automated. In general, the range of frequencies should be relatively consistent. What constitutes consistency may vary from data set to data set, but for a given set, it maybe possible to set conditions. For example, the range of frequencies can be defined as in which the highest frequency is a selected multiple of the lowest. Likewise, the range may be defined as a particular scalar range or a particular percentage change.

Once the instantaneous frequency volume is defined, an un-tuned biased volume is calculated based on the instantaneous amplitude (IA) and instantaneous frequency (IF) attributes. Simple sweet (SS) can be defined as $IA/(IF)^{1/2}$. This evaluation provides the ability to distinguish high amplitude low frequency portions of the volume from high amplitude high frequency portions. Each appears as bright in the amplitude volume, but tend to represent different types of structures. In particular, high amplitude low frequency structures tend to be thick formations while high amplitude high frequency structures can result from thin structures that are near to tuning thickness.

Figure 4A:
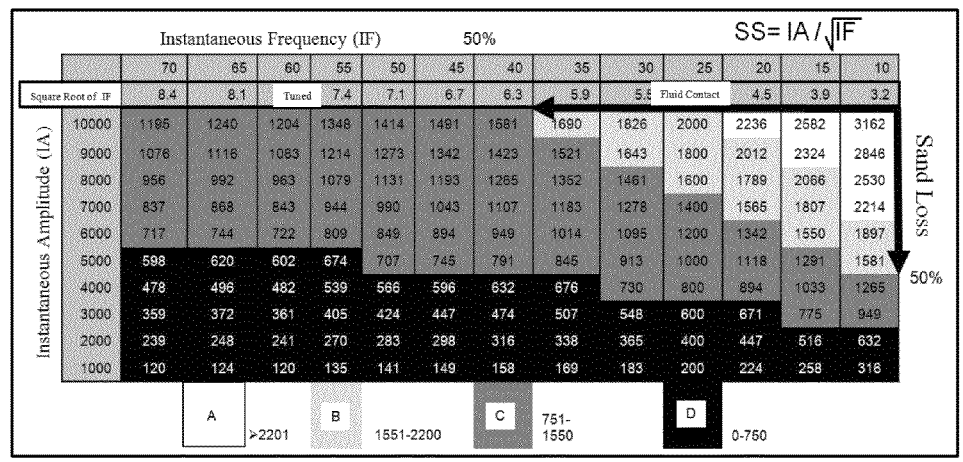
Figure 4B:
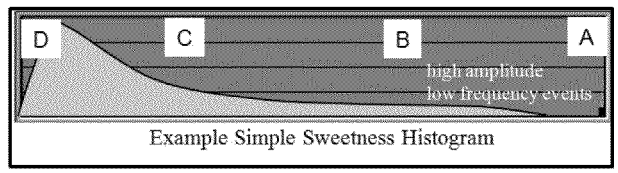

However, in certain circumstances, the simple sweet (SS) attribute will be unable to distinguish areas of interest. Particularly, for a thick sand zone having thin shale layers, the simple sweet (SS) attribute will tend to appear to result from the thin or thick shales, and not the thin or thick sand variations. On the other hand, it is quite effective when sand thickness is equal to the instantaneous amplitude envelope or less, and when the sand is surrounded by thick shale layers. FIG. 4a illustrates graphically the possible types of simple sweet (SS) data. In general, the left side of the chart relates to tuned layers while the right side can be considered to relate to fluid contacting regions. Region A includes high amplitude, low frequency data, shown in the upper right-hand corner of the chart. Moving towards the lower left from the upper right, the values decrease, and are less and less useful for distinguishing stratigraphic types. The values in zone B can be the result of either higher frequency (representative of fluid change, for example) or lower frequency along with weaker instantaneous amplitude (representative of sand loss, for example). The C and D zones likewise fail to provide strong indicators of whether frequency or amplitude is the cause of the lower values. A histogram of simple sweet (SS) is shown in FIG. 4b. Though the cutoff between the B and C zones is shown as 50% of the peak, this value is somewhat arbitrary and can be adjusted by a user when desired.

Figure 5:
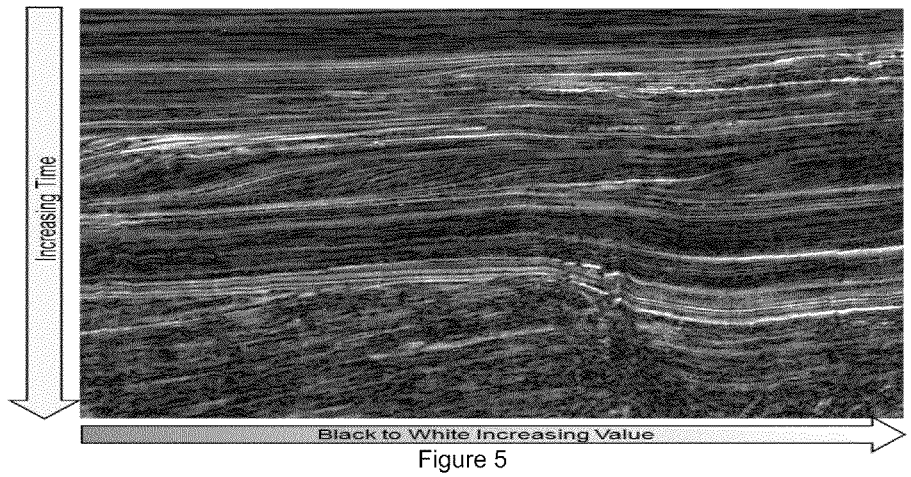
FIG. 5 is a simple sweet (SS) volume.

FIG. 5 illustrates a simple sweet (SS) volume in which zone A (top quartile of values) is shown in white, zone B (second quartile) in gray, and zones C and D in dark gray to black respectively. Zones A and B are the most likely to be sands, but there is no ability to distinguish thin hydrocarbon-bearing sands or wet sands in zone B. All of the C and D zones are considered to be low-probability regions.

Figure 6:
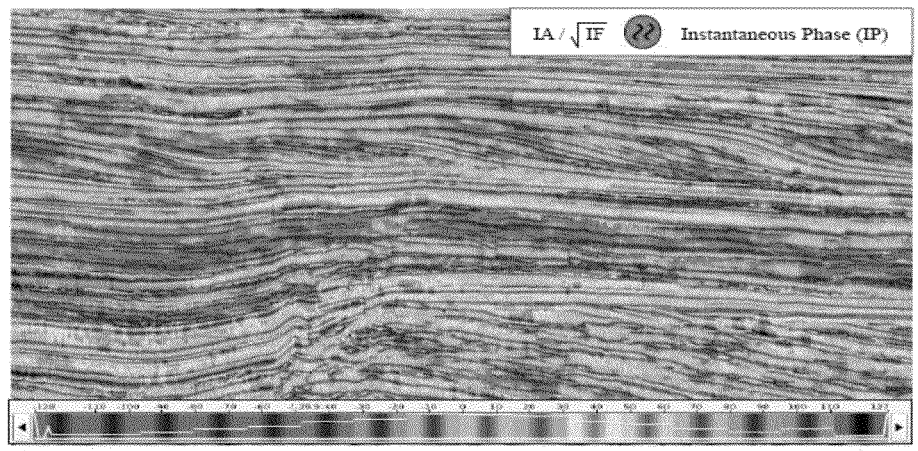
FIG. 6 is a blended simple sweet (SS) volume incorporating instantaneous phase (IP) information.

In accordance with an embodiment of the invention, blending the simple sweet (SS) volume with an additional volume helps to further distinguish the high value regions. One such approach is to blend the simple sweet (SS) volume with an instantaneous phase volume (IP) as illustrated in FIG. 6. In the example of FIG. 6, the simple sweet (SS) color is (red through green for high values, blue for low values) while IP is represented by changes in intensity. That is, as may be seen in the range between 95 and 111 in the scale at the bottom of the figure, the red (high value SS) is segmented into lower and higher intensity values. Likewise the other color ranges. One approach to this type of blending is discussed in greater detail below with reference to FIGS. 12-15. It should be noted that in the grey scale image, the reds and blues tend to appear similar in intensity. In this regard, areas of the image that include concentrations of red in the original include the lower left features and the three regions including very dark features in the upper left quadrant.

Figure 7A:
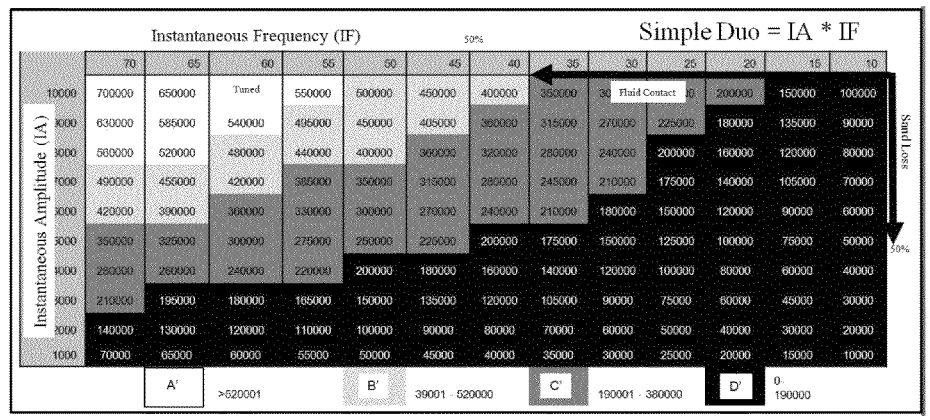
Figure 7B:
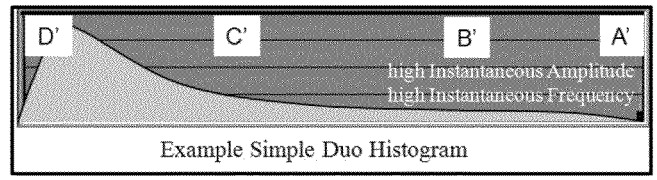
Figure 8:
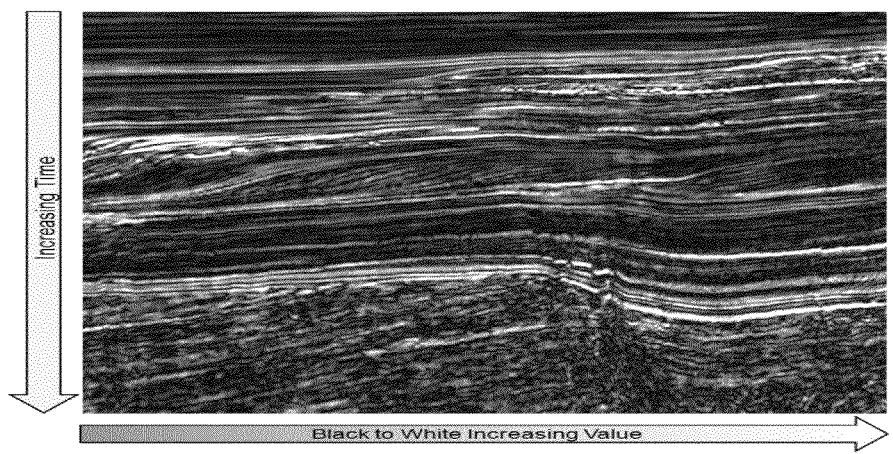
FIG. 8 is a simple duo volume (SD)

In similar fashion, a simple duo (SD) volume also known as simple tuned, can be created based on multiplying instantaneous amplitude (IA) and instantaneous frequency (IF) (IA-IF). In contrast to the simple sweet (SS) volume, high amplitude-high frequency events lie within the top quartile of the values instead of high amplitude-low frequency events. In FIGS. 7a and 7b, this region is designated A'. The white to light gray regions in the upper left quadrant are high amplitude, high frequency events that in turn represent likely tuning volumes. Values falling below the 50% mark (to the right) can result from either low IA with low IF or high IA with low IF. This simple duo volume is represented in FIG. 8.

Figure 9:
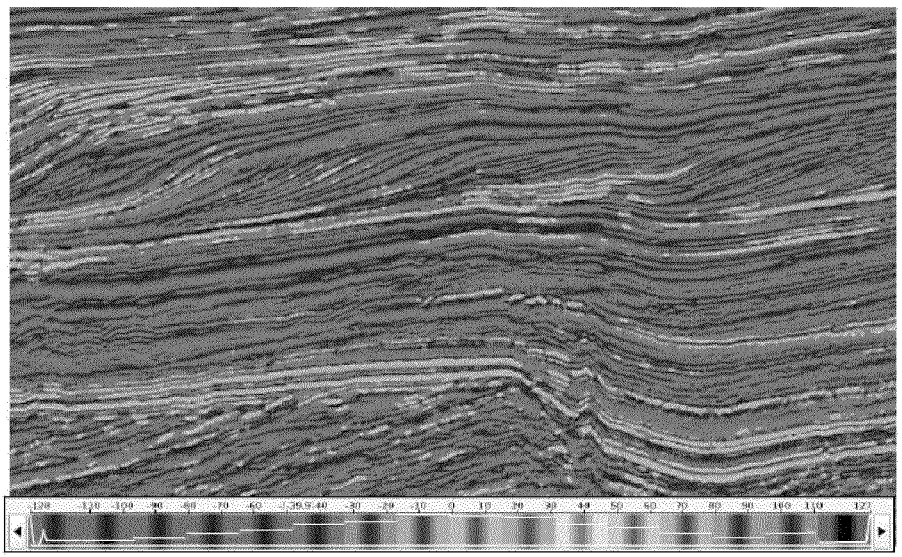
FIG. 9 is a blended simple duo (SD) volume incorporating instantaneous phase (IP) information.

According to a similar blending process, the simple tuned volume is blended with IP as shown in FIG. 9. As with the blending shown in FIG. 6, the color map is augmented with IP information represented by intensity values. The majority of the color map is blue, ranging from bright to dark blues. The brightest portions, nearly white in the grey scale are greens in the original but also include the very few reds, primarily interspersed with the greens, for example in the upper left and lower right corners of the figure.

Figure 10:
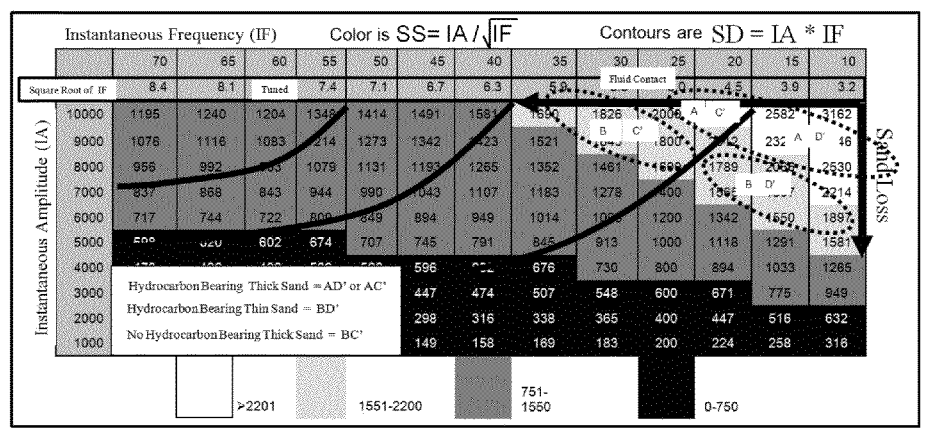
FIG. 10 is a chart of calculated values for the simple sweet (SS) attribute as shown in FIG. 4a including overlying simple duo (SD) contours.

FIG. 10 cross plots the simple sweet (SS) values (A, B) and simple duo (SD) values (C', D'). Contours of simple duo (SD) values are shown by the curved black lines, and regions are labeled in accordance with the cross plotted volumes. Higher simple sweetness (SS) values in combination with lower simple duo (SD) values indicate the presence of both high amplitudes and lower frequencies (A, C' and A, D'). These events are more likely to be thick hydrocarbon bearing sands. Likewise, (B, C') indicates high amplitudes with slightly higher frequencies than (A, C' and A, D'), indicating a thick non-hydrocarbon bearing sand. Finally, (B, D') has low frequencies with slightly lower amplitudes than (A, C' and A, D') indicating a potential hydrocarbon bearing thin sand that is still above tuning. The distinction of (B, C') thick potentially non hydrocarbon bearing sand and (B, D') potentially thin hydrocarbon bearing sands, in particular, was not available with simple sweet (SS) information alone.

Thus, A, C' and A, D' and B, D' are all likely hydrocarbon-bearing regions. Of those, B, D' is likely to be a thin region compared with the other two. On the other hand, B, C' is likely to be thick, but non-hydrocarbon-bearing. Thus, exploration well locations can be selected to take advantage of this information, avoiding the thick wet sand or the thin hydrocarbon-bearing sands that might otherwise appear to be fruitful targets.

Figure 11:
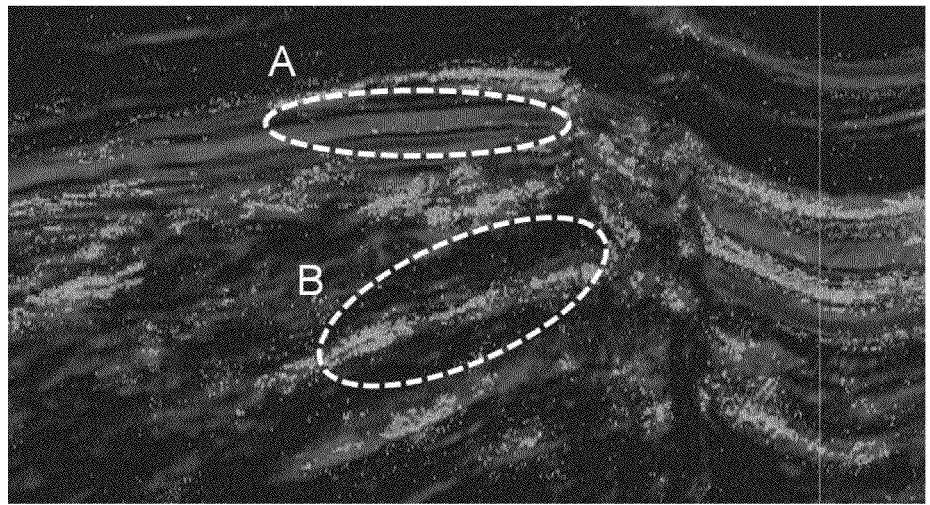
FIG. 11 displays a cross plot of simple sweet (SS) and simple duo (SD) detected values on a simple sweet (SS) volume.

FIG. 11 shows an example of this cross plotted data and how it can be useful. Section A of the figure shows a high sweetness event but no detected cross plot values. While FIG. 11 is shown in grey scale, the original is in color, with the portion outlined as Section A including yellows and reds in the bright central region and blues in the dark bands extending above and below that region. Section B shows both detected cross plot values (A, C' and A, D' and B, D') and a high sweetness event, indicated in the bright region, yellow in the original. This indicates that both events are High Amplitude-Low Frequency sweet events above tuning. However, because Section A does not contain any detected cross plot values, this indicates similar amplitudes but slightly higher frequencies. The slightly higher frequencies would indicate the absence of hydrocarbons. Thus, application of the present method would allow an exploratory well to avoid targeting the section A region based on the cross plotted data.

In an embodiment, the data may be further refined for evaluation by an appropriate subject-matter expert in a number of ways. In one approach, a connectivity algorithm may be applied to define suspected geobodies.

In an embodiment, the method can be implemented via simultaneous solution, negating any requirement to actually create the separate volumes. In this embodiment, there are no intermediate volumes created, but rather the blended volume is created in a single step.

Figure 12:
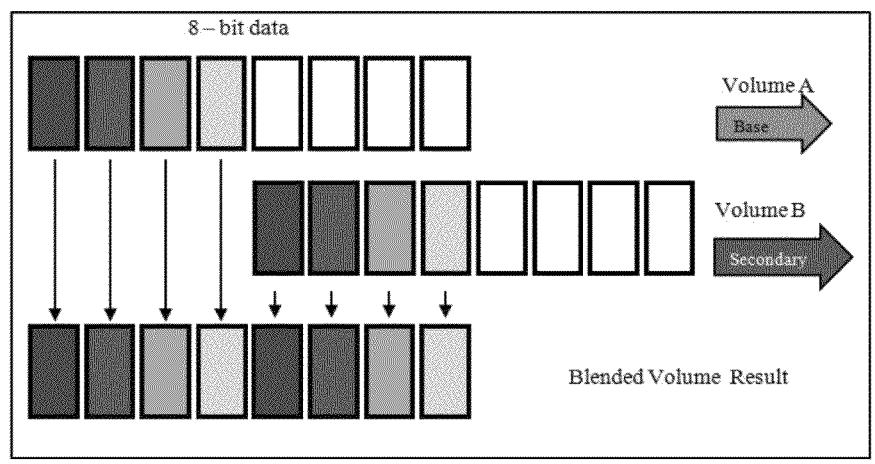
FIG. 12 is an illustration of a first step in a method for combining data volumes to produce blended color mappings for use in an embodiment of the invention.

Referring now to FIGS. 12-16, one approach to volume blending approach will be further described. As shown in FIG. 12, each of two volumes can be represented as a color gradient in 8-bit data (as an example, different color spaces could be selected without altering the principles of operation). Blending the two volumes gives a new 8-bit color gradient in which half of each of the original 8-bit gradients are included. In the case illustrated, the resulting set is a repeating 4-bit color gradient.

Figure 13:
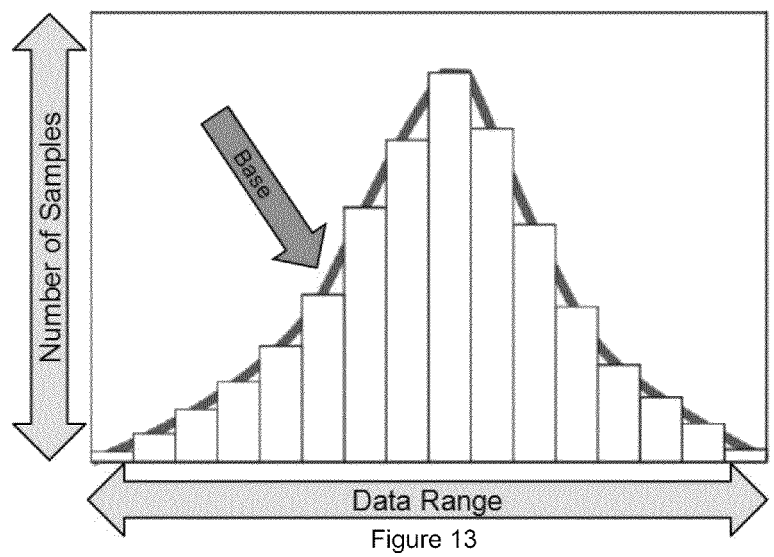
FIG. 13 is a histogram for a first, or base, volume.
Figure 14:
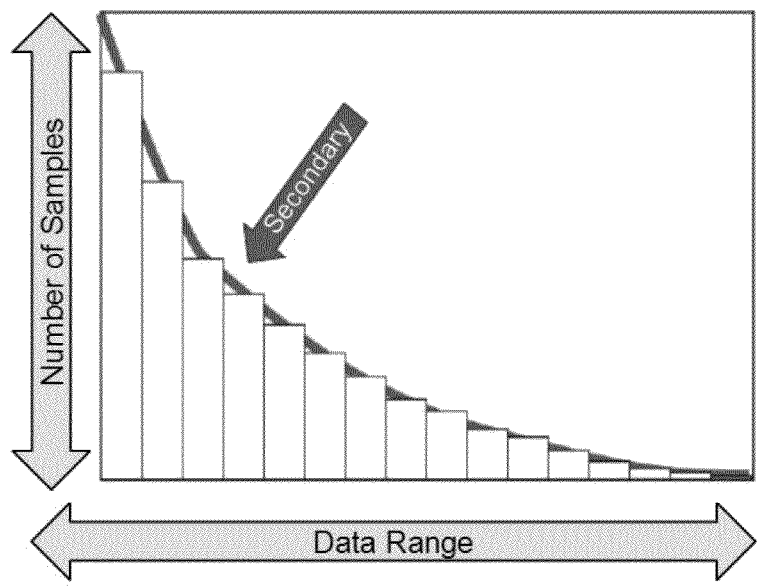
FIG. 14 is a histogram for a secondary, or attribute, volume.
Figure 15:
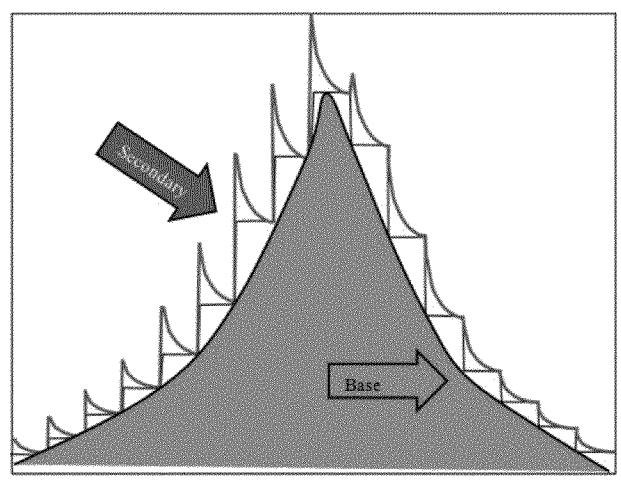
FIG. 15 is a histogram for a blended volume produced by blending the first and second volumes.

As shown in FIG. 13, the overall shape of the histogram is determined by one of the two volumes (the base volume). The second volume (attribute volume) determines the secondary histogram shape as illustrated in FIG. 14. These two histograms are combined to produce the blended shape as shown in FIG. 15. As can be seen from the figure, the blended histogram follows the broad outlines of the base volume with the attribute volume overlying it, creating a saw tooth effect.

Figure 16A:
FIGS. 16a-16c are color maps for hue (simple sweet), intensity (instantaneous phase), and blended simple sweet and instantaneous phase, respectively.
Figure 16B:
Figure 16C:
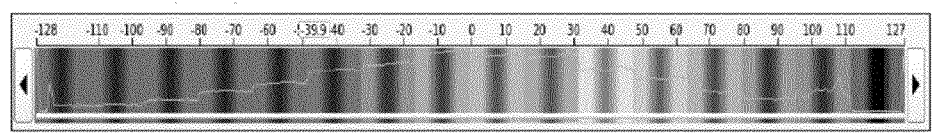

FIGS. 16a-16c illustrate the combination of hue and intensity (or value) to produce an image that includes information from both of two volumes. In the illustrated example, FIG. 16a shows a range of hues assigned to the simple sweet (SS) volume while FIG. 16b shows a range of intensities that are assigned to the range of Instantaneous Phases (IP). In its original color, FIG. 16a is a spectrum ranging from blue to red from left to right, represented in grey scale for the purposes of this disclosure. The hues and intensities are combined to produce the blended color map of FIG. 16c, represented in grey scale, proceeding from blue to red from left to right as in FIG. 16a, overlain with the intensity modulation.

As will be appreciated, the method as described herein may be performed using a computing system having machine executable instructions stored on a tangible medium. The instructions are executable to perform each portion of the method, either autonomously, or with the assistance of input from an operator. In an embodiment, the system includes structures for allowing input and output of data, and a display that is configured and arranged to display the intermediate and/or final products of the process steps. A method in accordance with an embodiment may include an automated selection of a location for exploitation and/or exploratory drilling for hydrocarbon resources.

Those skilled in the art will appreciate that the disclosed embodiments described herein are by way of example only, and that numerous variations will exist. The invention is limited only by the claims, which encompass the embodiments described herein as well as variants apparent to those skilled in the art. In addition, it should be appreciated that structural features or method steps shown or described in any one embodiment herein can be used in other embodiments as well.

The invention claimed is:

1. A method for evaluating stacked seismic trace data, comprising:
    (a) isolating a portion of each of a plurality of seismic traces representing physical properties of a subsurface region;
    (b) calculating and scaling an un-tuned biased volume for each trace;
    (c) calculating and scaling a tuned biased volume for each trace; and
    (d) combining the un-tuned and tuned biased volumes to determine zones having a high probability of containing hydrocarbon resources, wherein at least one of (a) through (d) is executed on a computer.

2. A method as in claim 1, wherein the isolating comprises selecting a top and base target zone for each seismic trace, such that the isolated portion lies between the selected top and base target zones.

3. A method as in claim 1, wherein the determined zones further comprise structures identifiable as geo-bodies and further comprising identifying selected geo-bodies in the determined zone as high probability geo-bodies.

4. A method as in claim 1, wherein the seismic traces comprise full-stack seismic traces.

5. A method as in claim 1, wherein the isolating further comprises selecting areas of the seismic traces based on instantaneous frequencies of the seismic trace.

6. A method as in claim 5, wherein a range of the instantaneous frequencies do not show significant changes.

7. A method for evaluating stacked seismic trace data, comprising:
    (a) isolating a portion of each of a plurality of seismic traces representing physical properties of a subsurface region by analyzing instantaneous frequency data for the seismic traces;
    (b) calculating simple sweet values for the seismic traces based on one or more instantaneous frequency attributes and one or more instantaneous amplitude attributes;

(c) blending the calculated simple sweet values with instantaneous phase information for the seismic traces;
(d) calculating simple duo values for the seismic traces based on the instantaneous amplitude attributes and the instantaneous frequency attributes;
(e) blending the calculated simple duo values with instantaneous phase information for the seismic traces; and
(f) cross-plotting the blended simple sweet values and instantaneous phase information with the blended simple duo values and instantaneous phase information to identify high probability zones that are likely to comprise hydrocarbon resources, wherein at least one of (a) through (e) is executed on a computer.

8. A method as in claim 7, wherein the cross-plotted blended information has a connectivity algorithm run on the resulting points and isolate them into separate geobodies.

9. A system for evaluating stacked seismic trace data, comprising:
a machine readable data storage device comprising seismic trace data representing physical properties of a subsurface region;
a processor, configured and arranged to:
calculate and scale an un-tuned biased volume for each trace;
calculate and scale a tuned biased volume for each trace; and
combine the un-tuned and tuned biased volumes to determine zones having a high probability of containing hydrocarbon resources.

10. A system as in claim 9, further comprising a color display, configured and arranged to display the combined volumes wherein a displayed image of the combined volumes comprises information relating to one of the volumes displayed as variation in hue and information relating to the other of the volumes displayed as variation in intensity.

11. A system as in claim 9, further comprising:
a user interface, constructed and arranged to allow a user to select a top and base target zone for each seismic trace to isolate a portion of each of the plurality of seismic traces such that the isolated portion lies between the selected top and base target zones.

12. A system as in claim 11, wherein the user interface is further constructed and arranged to allow the user to select areas of the seismic traces based on instantaneous frequencies of the seismic trace.

* * * * *